US012573829B2

(12) United States Patent
Johansen et al.

(10) Patent No.: US 12,573,829 B2
(45) Date of Patent: Mar. 10, 2026

(54) DEVICE, SYSTEM AND METHOD FOR INSTALLING AN OBJECT ON A POWER LINE

(71) Applicant: Heimdall Power AS, Sandnes (NO)

(72) Inventors: Brage W. Johansen, Røyneberg (NO); Sigurd Karolius Holand, Stavanger (NO); Rein Åsmund Torsvik, Sandnes (NO)

(73) Assignee: Heimdall Power AS, Sandnes (NO)

( * ) Notice: Subject to any disclaimer, the term of this patent is extended or adjusted under 35 U.S.C. 154(b) by 131 days.

(21) Appl. No.: 18/749,843

(22) Filed: Jun. 21, 2024

(65) Prior Publication Data

US 2024/0339821 A1      Oct. 10, 2024

Related U.S. Application Data

(63) Continuation of application No. 17/292,583, filed as application No. PCT/NO2020/050023 on Jan. 31, 2020, now Pat. No. 12,046,887.

(30) Foreign Application Priority Data

Jan. 31, 2019     (NO) .................................... 20190126

(51) Int. Cl.
*H02G 7/14*          (2006.01)
*B64C 39/02*        (2023.01)
(Continued)

(52) U.S. Cl.
CPC ............. *H02G 7/14* (2013.01); *B64C 39/024* (2013.01); *B64D 1/02* (2013.01); *B64U 20/87* (2023.01);
(Continued)

(58) Field of Classification Search
CPC ...... H02G 7/14; B64U 20/87; B64U 2101/60; B64U 2101/30; B64C 39/024; B64D 1/02
See application file for complete search history.

(56) References Cited

U.S. PATENT DOCUMENTS 4,794,328 A  *  12/1988  Fernandes ......... H02J 13/00034
                                                                 374/E1.004
2008/0246507 A1     10/2008  Gunn et al.
(Continued)

FOREIGN PATENT DOCUMENTS

CN          107275976          10/2017
CN          107850902          3/2018
(Continued)

OTHER PUBLICATIONS

Norwegian Search Report fort NO 20190126, dated Aug. 28, 2019.
(Continued)

*Primary Examiner* — Naeem Taslim Alam
(74) *Attorney, Agent, or Firm* — ANDRUS INTELLECTUAL PROPERTY LAW, LLP

(57) ABSTRACT

A drone is for installing an object on a power line. The drone has a connection means for connecting the drone to the object, so that the drone may carry the object. A first engagement member is for engaging a second engagement member on the object. A power source is for operating the first engagement member so as to actuate a locking means on the object, via the second engagement member, for securely locking the object to the power line. The drone further has a device for limiting one or more degrees of freedom of the object relative to the power line before engaging the locking means.

20 Claims, 19 Drawing Sheets

(51) Int. Cl.

| | | |
|---|---|---|
| *B64D 1/02* | (2006.01) | |
| *B64U 20/87* | (2023.01) | |
| *B64U 101/30* | (2023.01) | |
| *B64U 101/60* | (2023.01) | |

(52) U.S. Cl.

CPC ...... *B64U 2101/30* (2023.01); *B64U 2101/60* (2023.01)

(56) References Cited

U.S. PATENT DOCUMENTS

| | | | | |
|---|---|---|---|---|
| 2015/0314434 | A1* | 11/2015 | Bevins, Jr. | ........... B23D 59/001 408/124 |
| 2016/0023761 | A1 | 1/2016 | McNally | |
| 2018/0048187 | A1* | 2/2018 | White | ..................... H02J 50/12 |
| 2018/0126096 | A1 | 5/2018 | Norman et al. | |
| 2018/0157250 | A1* | 6/2018 | Barnickel | ............ G05D 1/0011 |
| 2018/0157254 | A1 | 6/2018 | Liu et al. | |
| 2018/0191118 | A1 | 7/2018 | Herron | |
| 2019/0049951 | A1* | 2/2019 | Liu | ...................... G05D 1/0038 |
| 2019/0077505 | A1* | 3/2019 | Akens | .................... B64U 50/34 |
| 2021/0232187 | A1* | 7/2021 | Birnbach | ............. H03K 5/1254 |

FOREIGN PATENT DOCUMENTS

| | | |
|---|---|---|
| FR | 3055419 | 3/2018 |
| JP | 2003289608 | 10/2003 |
| JP | 2005271831 | 10/2005 |
| JP | 2018140704 | 9/2018 |
| RU | 2644420 | 2/2018 |
| WO | 2014161428 | 10/2014 |
| WO | 2018126096 | 7/2018 |

OTHER PUBLICATIONS

International Search Report and the Written Opinion for PCT/NO2020/050023, dated May 11, 2020.

Response to the Written Opinion for PCT/NO2020/050023, dated Nov. 19, 2020.

Second Written Opinion for PCT/NO2020/050023, dated Feb. 15, 2021.

Office Action issued in Japanese Patent Application No. 2021-541592, dated Apr. 26, 2023.

* cited by examiner

DEVICE, SYSTEM AND METHOD FOR INSTALLING AN OBJECT ON A POWER LINE

CROSS-REFERENCE TO RELATED APPLICATIONS

This application is a continuation of U.S. patent application Ser. No. 17/292,583, filed May 10, 2021, which '583 application is the U.S. national stage application of International Application PCT/NO2020/050023, filed Jan. 31, 2020, which international application was published on Aug. 6, 2020, as International Publication WO 2020/159384 in the English language. The International Application claims priority of Norwegian Patent Application No. 20190126, filed Jan. 31, 2019. All of the above applications are incorporated herein by reference, in entirety.

FIELD

The present invention relates to a drone for installing an object on a power line. More specifically the invention relates to a drone for installing an object on a power line where the drone comprises a connection means for connecting the drone to the object, so that the drone may carry the object; a first engagement member for engaging a second engagement member on the object; and a power source for operating the first engagement member so as to actuate a locking means on the object, via the second engagement member, for locking the object to the power line. The invention further relates to an object for installation on a power line, a drone assembly comprising such a drone and such an object as well as to a method for installing an object on a power line.

BACKGROUND

Installation of objects on power lines, often in inaccessible areas, has been known to be both difficult and time-consuming. The objects, that historically and normally have been various types of safety/warning/visibility markers, have been installed by means of one or two helicopters and several operators, both for flying the helicopter(s) and for performing the actual installation process.

In the recent years, drones, often also commonly referred to as unmanned aerial vehicles (UAVs), have received a lot of attention due their improved performance, including increased power and improved maneuverability and battery lifetimes. Drones are increasingly used for inspection and maintenance work on infrastructure that previously required manned aircrafts.

Drones have also been disclosed that may connect safety markers to power lines, such as in RU 2644420 C1. In this Russian patent, a drone is disclosed that is connectable to a safety marker and that is adapted to fly the safety marker to the power line, position drone so that the power line is received within a recess of the safety marker or between two halves of the safety marker and thereafter connecting the safety marker to the power line by clamping, the clamping being actuated by the drone while the power line is in the recess or between the two halves.

A challenge with the solution disclosed in RU 2644420 C1 is that it may be difficult to correctly position the safety marker relative to the power line before clamping is actuated by the drone. This challenge may be specifically pronounced when installing safety markers on power lines in windy conditions.

US 2016/0023761 A1 discloses a drone including passive guide that may be used to orient the drone relative to a power line prior to connecting a safety marker to the power line.

For safety markers, a small offset from the ideal, central positioning of the power line may be acceptable as long as the safety marker is securely connected to the power line. However, recently it is had been proposed to install electronic devices on power lines for monitoring the condition of the power lines, such as for monitoring power, temperature, line tension, vibrations etc. Electronic devices for monitoring power lines have also been proposed that will be inductively energised by the power line itself. For such electronic monitoring devices, predictable and correct positioning will be indispensable for their functionality.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

It should be noted that by "power line" herein is meant both actual conductor lines as well as ground wires (shield wires, static wires, earth wires etc.) or any other line that is provided in relation to overhead power lines.

In a first aspect the invention relates more particularly to a drone for installing an object on a power line, where the drone comprises: a connection means for connecting the drone to the object, so that the drone may carry the object; a first engagement member for engaging a second engagement member on the object, a power source for operating the first engagement member so as to actuate a locking means on the object, via the second engagement member, for locking the object to the power line, wherein the drone further comprises a device for limiting one or more degrees of freedom of the object relative to the power line before engaging the locking means.

By letting the drone limit one or more degrees of freedom of the object relative to the power line before locking the object to the power line, the locking process may become more reliable and the positioning of the object on the power line may become more precise and predictable. By "limit" is meant to reduce the ability to move or rotate relative to the power line or to fully lock the ability to move or rotate relative to the power line. The one or more degrees of freedom may be rotational and/or translational degrees of freedom. In one embodiment, the drone may be adapted to limit all six degrees of freedom of the object relative to the power line before engaging the locking means and locking the object to the power line, whereby a very precise positioning and orientation of the object relative to the power line may be achieved. In another embodiment, the object may still be allowed some axial movement along the power line (translational freedom along the power line may be non-limited or reduced to a certain extent) and/or rotation around the power line before engaging the locking means, while remaining degrees of freedom may be limited (reduced or fully locked). In other embodiments one or more degrees of freedom may be reduced without being fully locked, while other degrees of freedom may be fully locked. It should also be noted that during an installation process, the object will be connected to the drone via the connection means so that the object has a fixed position and orientation relative to the drone.

The locking means may be a mechanical or hydraulic linear actuator activated via the first engagement member, powered by the power source on the drone. In a simple embodiment, the locking means may be a screw working as a linear actuator to bring two halves of the object together or to close a recess or pocket on the object, with the advantage that the object can be locked to the power line by means of a simple torque tool on the drone and that the locking process is reversible in the event that the locking process was unsuccessful or if the object needs to be maintained. In an alternative embodiment, the locking means may be a biasing member such as a biased spring, piston or similar, adapted to clamp two halves of the object together or to close a recess or pocket of the object. The biasing member may be releasable from the drone.

The second engagement member, on the object, may typically be the head of a screw, an eye, a nut, a bracket or any other means that may be engaged by the first engagement member on the drone, complementary fitting to the second engagement member. In one specific embodiment, the first engagement member may be a box spanner with an internal hexagonal shape bit while the second engagement member is a complementary fitting nut-shaped head of a screw.

In one embodiment, the device for limiting one or more degrees of freedom may be adapted to move from an idle position to an active position, where the device limits one or more degrees of freedom of the object relative to the power line, independently of the drone. This implies that the drone may be kept at a fixed position relative to the power line, while the device for limiting one or more degrees of freedom is moved to an active position, which simplifies positioning and navigation of the drone and subsequent locking of the object to the power line. The device for limiting one or more degrees of freedom of the object may include one or more operable, arms, and/or clamps etc. that may be moved to an active position where the device engages the power line.

In one specific embodiment the device for limiting one or more degrees of freedom of the object relative to the power line may comprise two pairs of arms, the pairs of arms being provided with a horizontal distance therebetween, each arm in the pairs of arms being individually rotatable to engage the power line so that each pair of arms is adapted hold or isolate the power line therebetween before actuating the locking means. When the arms are rotated to their "active"/ limiting position, the power line will typically be isolated or held between the arms and surfaces on the object. Using individually rotatable arms provides a simple and robust mechanism for holding/isolating the power line before engaging the locking means. A horizontal distance between the pair of arms also ensure that the object's ability to rotate in the horizontal plane including the power line is limited. In a preferred embodiment, the device for limiting one or more degrees of freedom may be adapted to hold/isolate the power line in a central position of the object such that the power line runs through the spatial centre of the object and that the power line is locked centrally in the object after engaging the locking means. In one embodiment the object may have a substantially spherical form and the power line may be locked symmetrically and centrally in the sphere.

The device for limiting one or more degrees of freedom may be powered by means of the same power source as the first engagement member or by means of a separate power source. The rotatable arms may be driven by a small servo motor powered by the mentioned power source and controlled by an operator via remote control, or autonomously via a control unit. It should be noted that in a simpler embodiment, as will be disclosed in the following, the device for limiting one or more degrees of freedom may be purely mechanical and operable without a separate power source.

In an alternative embodiment the device for limiting one or more degrees of freedom of the object relative to the power line may comprise a pair of clamps, the clamps being provided with a horizontal distance therebetween, and each clamp in the pair of clamps being adapted to move in a downward or upward vertical direction upon release of a holding member to engage or isolate the power line before actuating the locking means. The clamps may be biased to move or adapted to move simply by their own weight upon release. Biasing may be provided with a loaded spring, piston or similar, while the holding member may be a pin, a hook, a jaw or any other device adapted to hold back the biasing member and eventually release the clamp so as to activate the locking of the power line. Release may be mechanically activated by the holding member getting in physical contact with the power line. In a more sophisticated embodiment, the holding member may be an electromagnetic device, such an electromagnet, adapted to release the biasing member upon receipt of an electric control signal from an operator or control unit. The control signal may be manually executed, or the control signal may be based on data from one or more sensors in a closed control loop as will be discussed below.

In one embodiment, the drone may be provided with a camera enabling control and positioning of the drone relative to the power line by an operator and/or automated control of the drone based on images captured by the camera. The actual fine positioning of the drone so that the power line is correctly positioned relative to the object may be done fully manually via camera operation, or it may also be fully or partially based on autonomous software control of the drone via input from camera and/or other sensors. In one embodiment, the crude operation of flying a drone up to a power line may be done by an operator, while the fine positioning of the drone and the object may be done by a control unit provided with control algorithms adapted to recognize the power line, by means of the camera, and to ensure that the object is correctly positioned and oriented relative to the power line before engaging the device for limiting degrees of freedom of the object relative to the power line and before locking the object to the power line. The camera may be operating in the visual or non-visual, such as in the infrared, part of the spectrum.

In addition, or as an alternative, the drone may comprise a proximity sensor for sensing the position of the power line relative to the device for limiting one or more degrees of freedom of the object relative to the power line. This may be particularly useful to ensure that the device for limiting one or more degrees of the object relative to the power line is not fully engaged/activated before the object is in a correct position and/or orientation. In one embodiment, where the device for limiting one or more degrees of freedom comprises two pairs of arms as discussed above, a proximity sensor may be provided on one arm in one or both pairs of arms to sense the proximity of the power line, and only when the power line is in proximity of one arm, that may already be engaged to extend in a vertical direction, the other one of the arms in the pairs of arms may be engaged to enclose the power line between the arms. The proximity sensor may be any sensor adapted to sense the proximity of the power line.

In a simple embodiment, the proximity sensor may be a microswitch, which upon physical contact of the power line activates the device for limiting one or more degrees of freedom. In another embodiment, the proximity sensor may be a sensor adapted to sense the proximity (close distance or immediate contact) of the power line based on pressure, temperature, electrical resistance, radio frequencies or light, wherein the light does not necessarily have to be visible.

In one embodiment, the drone may comprise a control unit adapted to activate the device for limiting one or more degrees of freedom of the object relative to the power line based on a signal received from the proximity sensor and/or images received from a camera. A control unit may also, as explained above, be provided with control algorithms for autonomously positioning the drone with the object on the power line, whereby little or no manual control of the final stages of connecting the object to the power line may be needed.

In a second aspect, the invention relates to an object for installation on a power line, the object comprising a locking means for securely locking the object to the power line, the locking means further comprising a second engagement member for being engaged by the first engagement member on the drone in order to actuate the locking means.

In one embodiment, the locking means may be a screw adapted be operated and actuated by the drone upon engagement of the second engagement member on the object by the first engagement member on the drone. The first engagement member may be rotatable from the drone, whereby the combined drone and object system works as a linear actuator for locking the object on the power line.

In one embodiment, the object may be an electronic device for monitoring the condition of the power line, such as one or more of the following parameters: current; temperature; sag/tension in the line (including snow load); vibration; galloping line; and corona.

Preferably the object may also be adapted to store and/or to communicate the monitored data to another similar object and/or to a central control unit adapted to monitor the condition of a power grid and thereby to optimize the performance of the power grid based on the received data. In an alternative embodiment, the object may be a safety marker. The object may also be a combined electronic device for monitoring and safety marker.

In an alternative embodiment the object may further comprise a third engagement member, also connected to the locking means, separate from the second engagement member, adapted to be engaged by a hot stick in order to actuate the locking means manually. This may be advantageous if an operator needs to install or maintain an object on a power line, whereby the operator may engage the same locking means but from a different position without the use of a drone. Normally, the third engagement means will be placed at the lower side of the object, making it possible for an operator to reach it from below. The third engagement means may be the head of a screw, an eye, a nut, a bracket or any other means that may be engaged by a hot stick with complementary fitting engagement means.

In one embodiment, the object may be substantially spherical, which may be beneficial for aerodynamic reasons, but the object may be formed by any geometrical shape, such as the shape of an American football. The object may be provided as essentially two halves that may be brought together to be locked to the power line. Alternatively, the object may be formed with a recess or pocket where the power line may be locked in place. In yet another embodiment, the object may be provided with a bracket that may locked to clamp the power line to the outside of the object.

In a third aspect, the invention relates to a drone assembly comprising a drone according to the first aspect of the invention and an object according the second aspect of the invention, the object being connected to the drone by means of the connection means.

In a fourth aspect, the invention relates to a method for installing an object on a power line, the method comprising the steps of: connecting the object to a drone; flying the drone, carrying the object, towards the power line; positioning the object relative to the power line so that the power line is received within a recess or pocket of the object or between two halves of the object; locking the object to the power line by closing the recess or pocket or by bringing the two halves together; disconnecting the drone from the object; and flying the drone away from the power line, wherein the method, before the step of locking the object to the power line, further comprises the step: by means of the drone; limiting one or more degrees of freedom of the object relative to the power line.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 1:
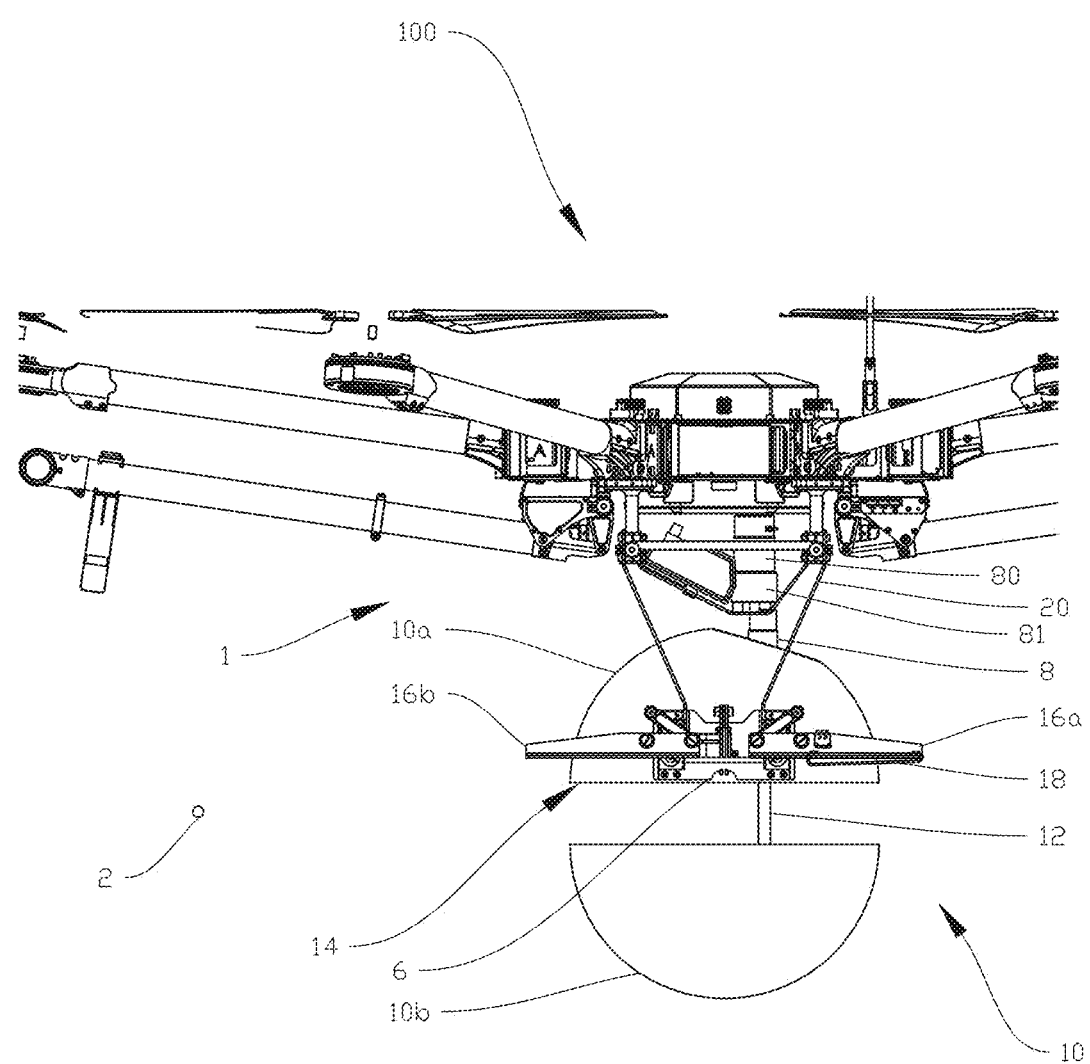
FIGS. 1-9 show, in a side view, various stages of a process of installing an object on a power line by means of a drone according to the present invention.

In the following the reference numeral 1 will be used to denote a drone for installing an object on a power line, reference numeral 10 will be used to denote an object for installation on a power line, while reference numeral 100 will denote a drone assembly including such a drone 1 connected to such an object 10. Identical reference numerals will be used to denote identical or similar features in the drawings. The drawings are shown schematic and simplified and various features therein may or may not be drawn to scale.

Reference is now made to FIGS. 1-9, where various stages of installing an object 10 to a power line 2 by means of a drone 1 according to the invention are shown. The object 10 is here shown in the form of a substantially spherical, electronic device for monitoring the status of the power line 2. The details and functionality of the electronics for monitoring will not be discussed herein. The drone 1 connected to the object 10, as shown in FIGS. 1-8, constitutes a drone assembly 100. The drone 1 is provided with a connection means 6 in the form of a bracket, connectable to screws 7 on the object 10. A bracket 6 with similar functionality is shown in further detail in FIGS. 10-12 and will be discussed below. The bracket 6 connects the drone 1 to the screws 7 on the object 10 in a simple and reliable manner so that the drone 1 may carry the object 10 and so that the drone 1 may release the object 10 from the bracket 6 once the object 10 is securely connected to the power line 2.

The drone 1 comprises a first engagement member 8 in the form of the head of a torque tool rotatable by means of an electric motor 80 via a gear 81. The motor 80 is powered by a not shown power source in the form of a battery. The head of the torque tool 8 is formed with a not shown internal hexagonal shape complementary fitting to a second engagement member in the form of a not shown nut-shaped hexagonal head of a screw 12. The screw 12 is provided with external threads complementary fitting to internal threads in upper half 10a of the object 10. The torque tool therefore simply functioning as a box spanner. By rotation of the of the torque tool, when the first and second engagement members are engaged, the screw 12 will rotate, whereby the lower half 10b of the object will be displaced linearly in an upward vertical direction towards the upper half 10a of the object 10, whereby the screw acts as a simple locking means in the form of a mechanical, linear actuator. When the two halves 10a, b of the object 10 are brought fully together, the object 10 will be securely locked to the power line 2.

In order to ensure that the object 10 is in a correct position and orientation relative to the power line 2 before the locking means 12 is engaged/activated, the drone 1 is provided with a device 14 for limiting one or more degrees of freedom of the object 10 relative to the power line 2 before the locking means 12 is engaged. In the embodiment of FIGS. 1-9, the device 14 for limiting one or more degrees of freedom is exemplified by two pairs of arms, wherein each arm 16a, 16b in each of the pairs of arms are individually rotatable between a horizontal, non-engaged position and a vertical, engaged position as will be explained in the following. Since the arms 16a, 16b are movable from an idle position to an active position, where the arms 16a, 16b limit the degrees of freedom of the object 10 relative to the power line 2, the drone 1 may be kept at a fixed position relative to the power line 2 while the device for limiting one or more degrees of freedom is activate. This would not be possible if the device for limiting one or more degrees of freedom where simply passive guide or similar, since that would require lowering of the drone 2 towards the power line 2 during activation. It should be noted that since FIGS. 1-9 show the drone assembly 100 in a side view, only one of the two pairs of arms are shown in the figures. The other, not shown pair of arms is symmetrically provided on the other side of the drone 1. The arms are operable by means of a small, not shown servo motor adapted to be activated by remote signal from an operator or by autonomous control as mentioned above.

Figure 2:
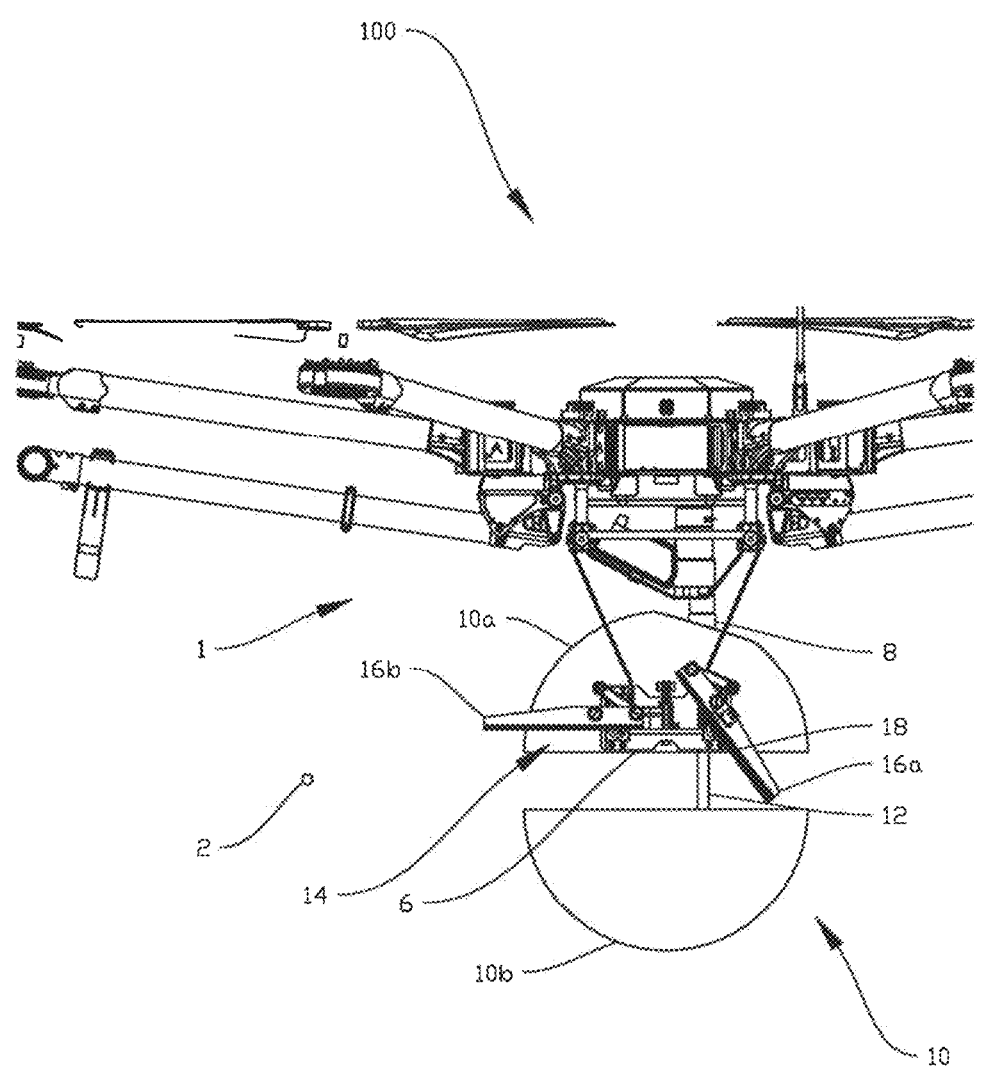
Figure 3:
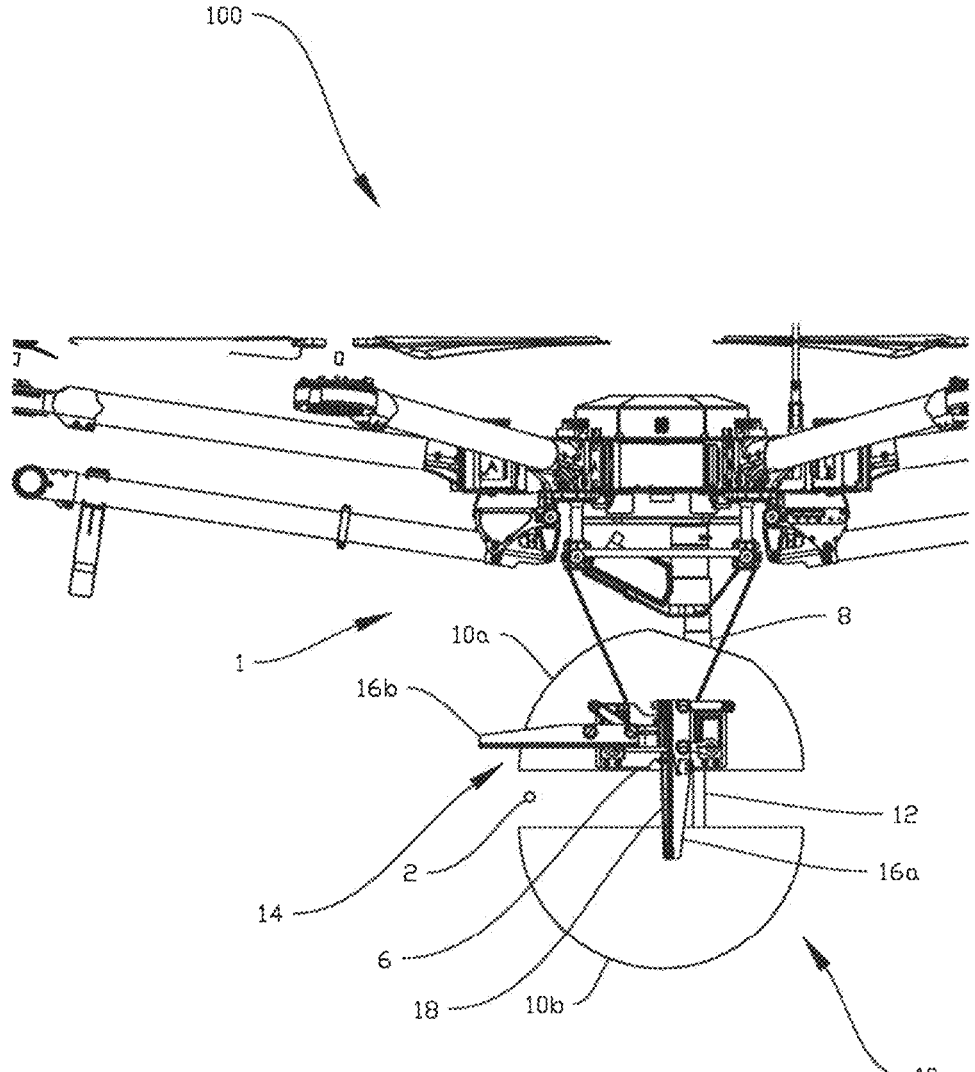
Figure 4:
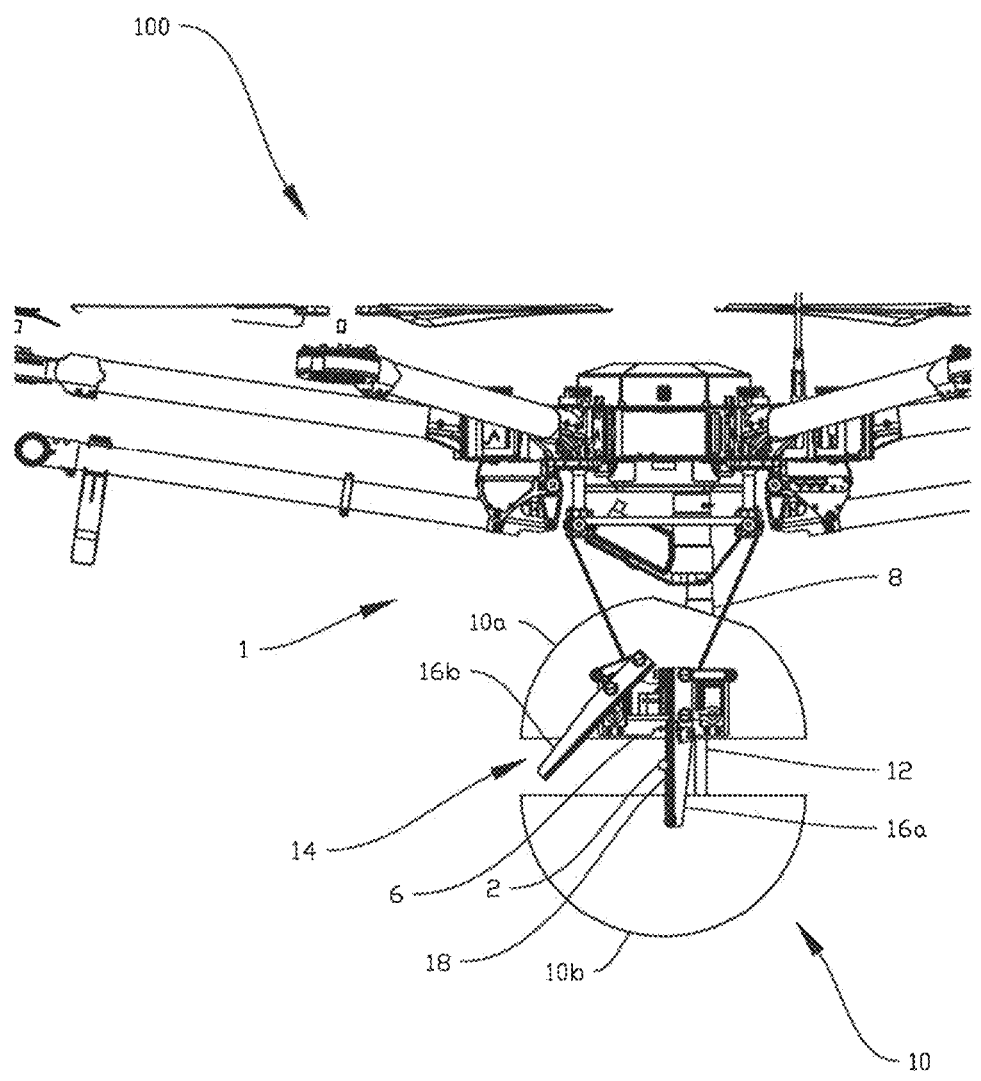
Figure 5:
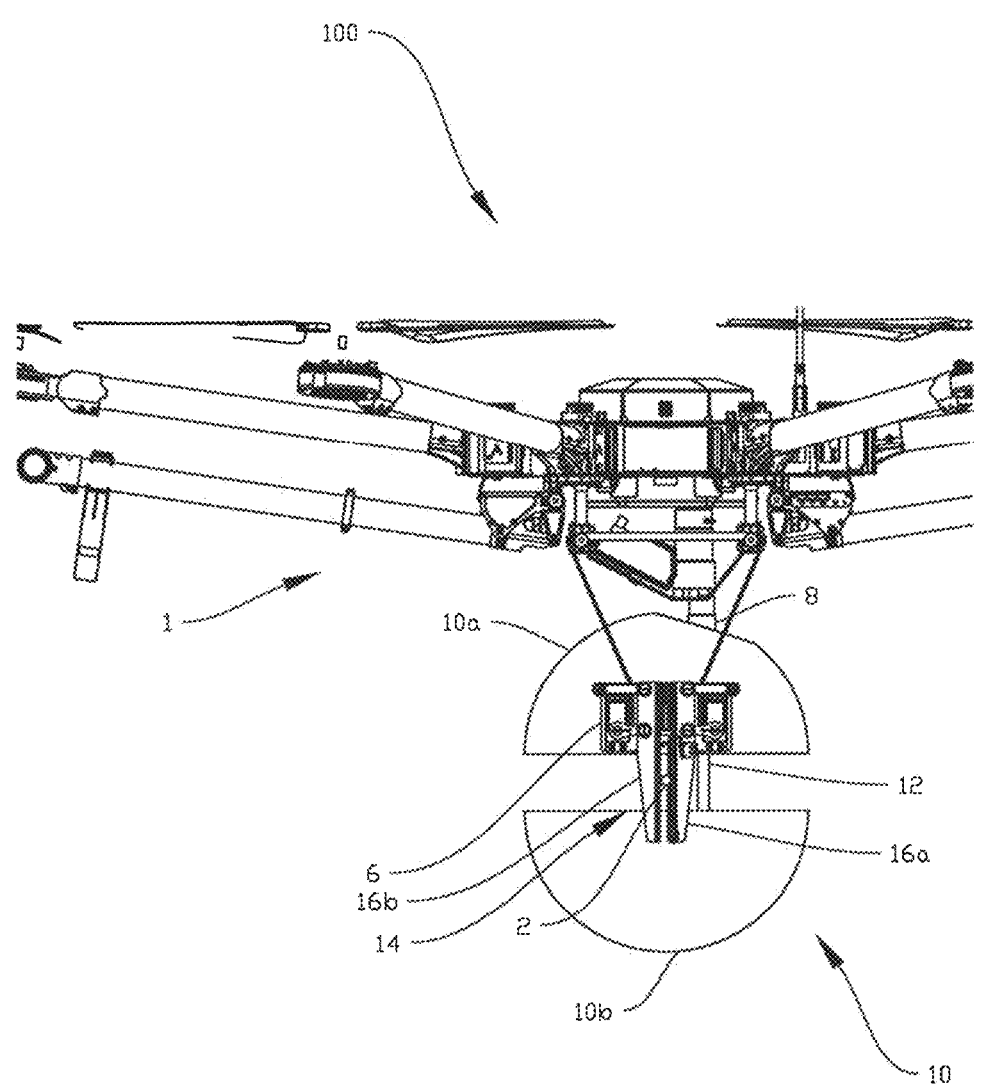
Figure 6:
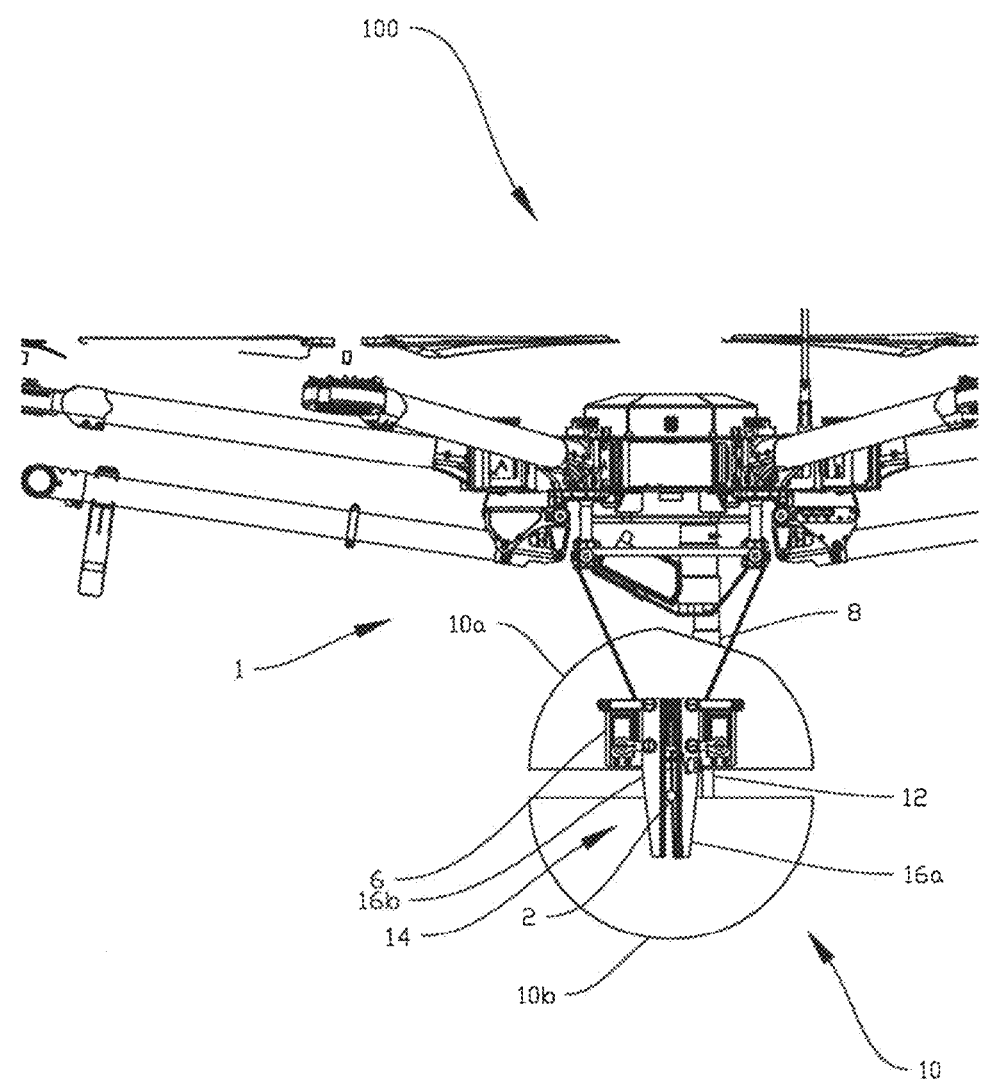
Figure 7:
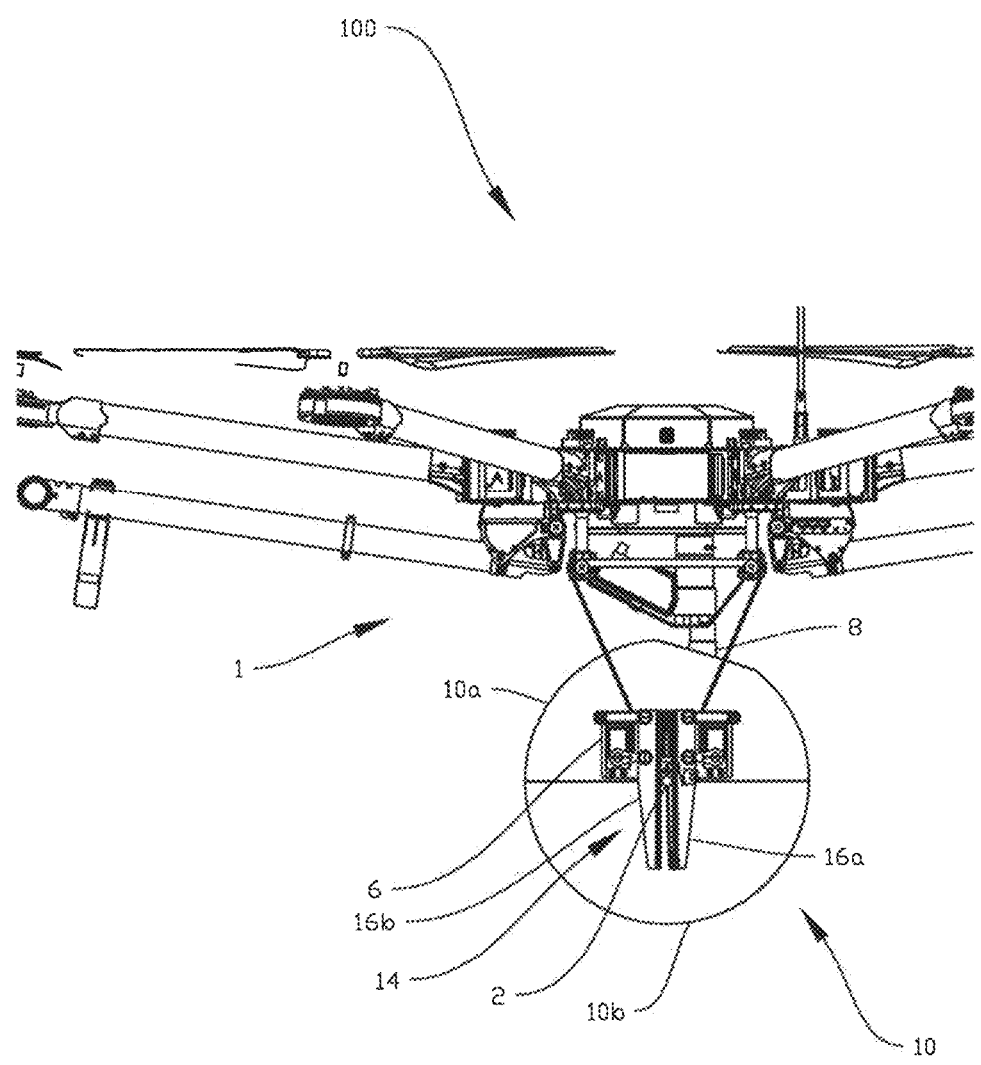
Figure 8:
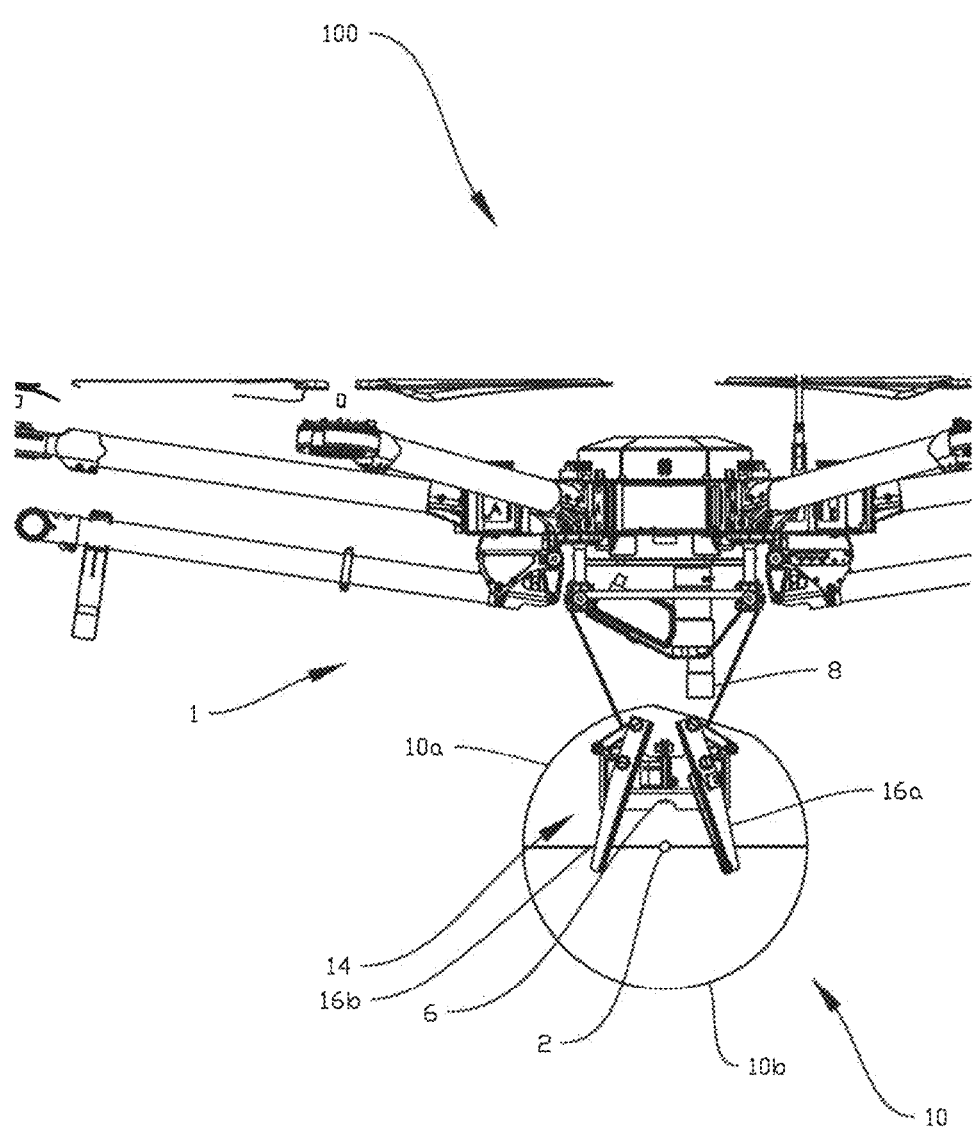
Figure 9:
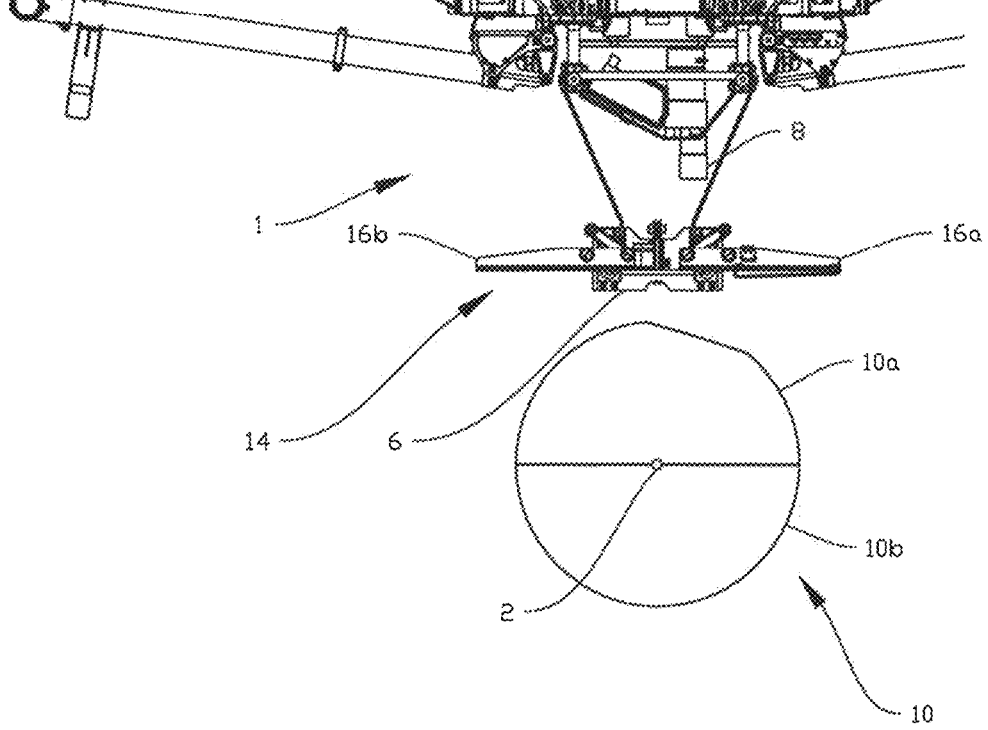

When the drone assembly 100 flies towards the power line 2, both arms 16a, b are in a horizontal, non-engage position as indicated in FIG. 1. When the drone assembly 100 is approaching the power line 2, the camera on the drone 1 sees the power line. A first arm 16a in each pair of arms is then rotated into a vertical position, as indicated in FIGS. 2 and 3. The activation of the first arm 16a in each of the pairs of arms may be done by an operator receiving live images captured by the camera on the drone 1, or the activation may be done automatically by means of a control unit provided with software adapted to recognize the power line 2 and thereby automatically engage the first arms 16a before the drone 1 moves the object 10 in over the power line 2. When the first arms 16a have been rotated into a vertical position, the drone 1 moves the object 10 so that the first arms 16a come into contact with the power line 2, as indicated in FIG. 4. Already at this stage, a rotational degree of freedom of the object 10 relative to the power line 2 is limited since there is an axial distance between the first arms 16a along the power line 2. Further translational movement of the object 10 in the same direction in over the power line is also prevented. A sensor, here shown in the form of a microswitch 18, senses when the power line 2 gets into contact with first arms 16a in the pair of arms. Based on the sensed contact of the power line 2 by the microswitch 18, the second arms 16b in the pair of arms are immediately activated, i.e. rotated into a vertical position, as indicated in FIG. 4. In FIG. 5 both arms 16a, b in both pair of arms have been engaged to extend in a vertical direction so that the power line 2 is held between the two arms 16a, b in each pair of arms. At this stage, rotational movement in a plane of the power line 2, i.e. about an axis extending between the power line and a centre of the drone, as well as translational movement perpendicularly to the power line in the same plane are completely locked. The other degrees of freedom are limited or locked, where the degree of limitation is dependent on the frictional contact between the arms 16a, b and the power line 2. Vertical translational movement between the object 10 and the power line 2 is limited as the power line 2 in any case is kept in the space between the arms 16a, b and the upper and lower halves 10a, b of the object 10. At this stage, the head of the torque tool 8 on the drone 1 engages the head of the screw 12 on the object if not already engaged. The torque tool is then activated to move the lower half 10b of the object 10 towards the upper half 10a of the object 10, as indicated in FIG. 6, where the vertical gap between the two halves 10a, b has been reduced, and in FIG. 7 where the two halves 10a, b have been brought into contact so that the power line 2 is locked to the object 10. In the shown embodiment, the power line 2 passes centrally through the object 10, which has a generally spherical form. In the shown embodiment, the object 10 is prevented from gliding along the power line 2 due to frictional contact between the inside of the object 10 and outside of the power line 2. After the object 10 has been securely locked to the power line 2, the arms 16a, b in the pair of arms may be disengaged and rotated back to their horizontal position, as indicated in FIG. 8. The disengagement of the arms 16a, b may be done by means of an operator having verified the secured locking of the object 10 to the power line 2, or by means of an autonomous/automatic system adapted to recognize that the object 10 has been securely locked to the power line 2 and thereafter release the arms 16a, b based on this information. When the arms 16a, b are being disengaged from the power line 2, the connection means 6, which in the shown embodiment is a bracket, is also disconnected from the object 10, and the drone is flown away from the power line 2, e.g. to pick up another object 10 to be installed at another position along the power line 2.

Figure 10:
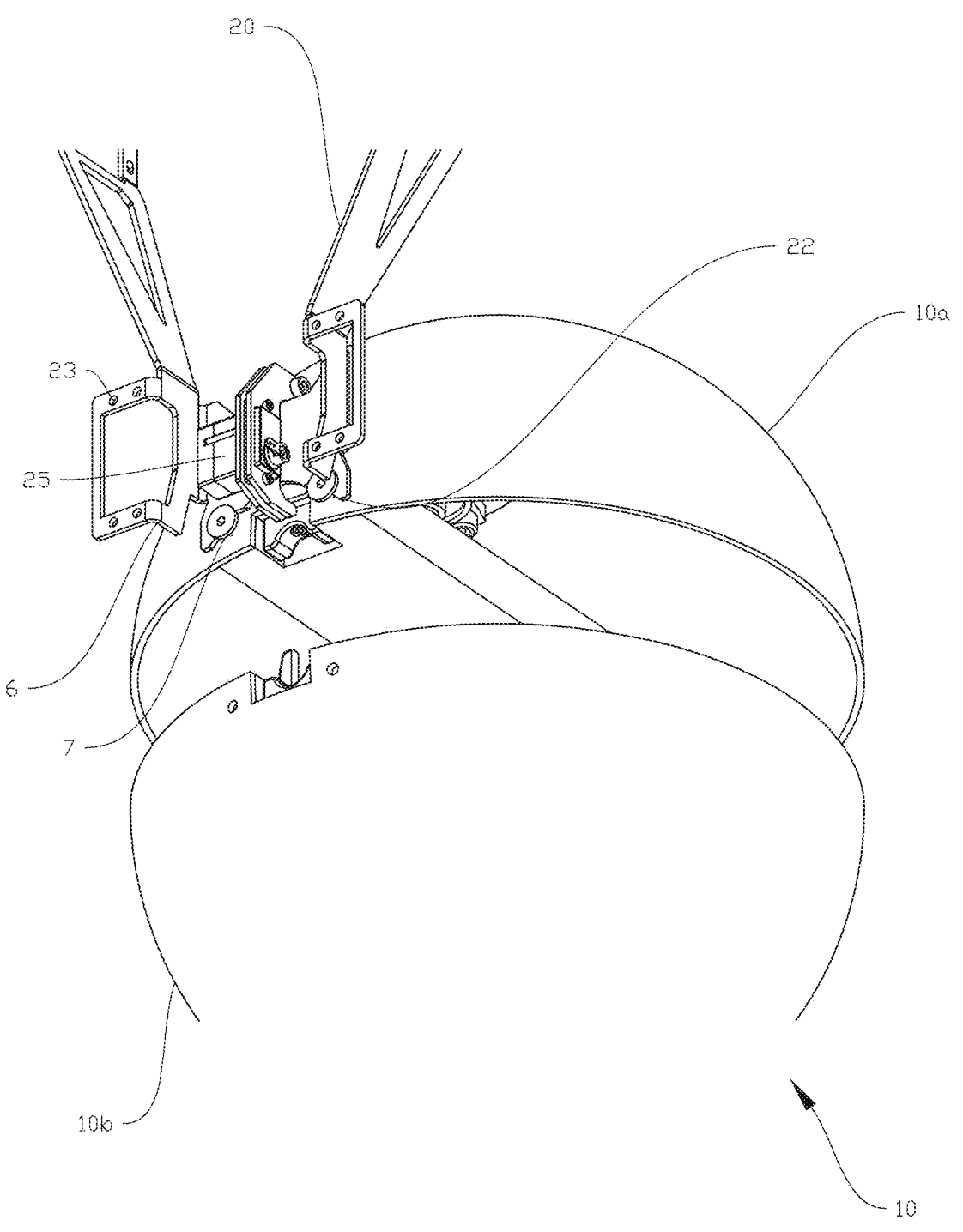
FIGS. 10-12 show, in a slightly enlarged perspective view, details of a connection means for connecting and disconnecting the drone to and from the object.
Figure 11:
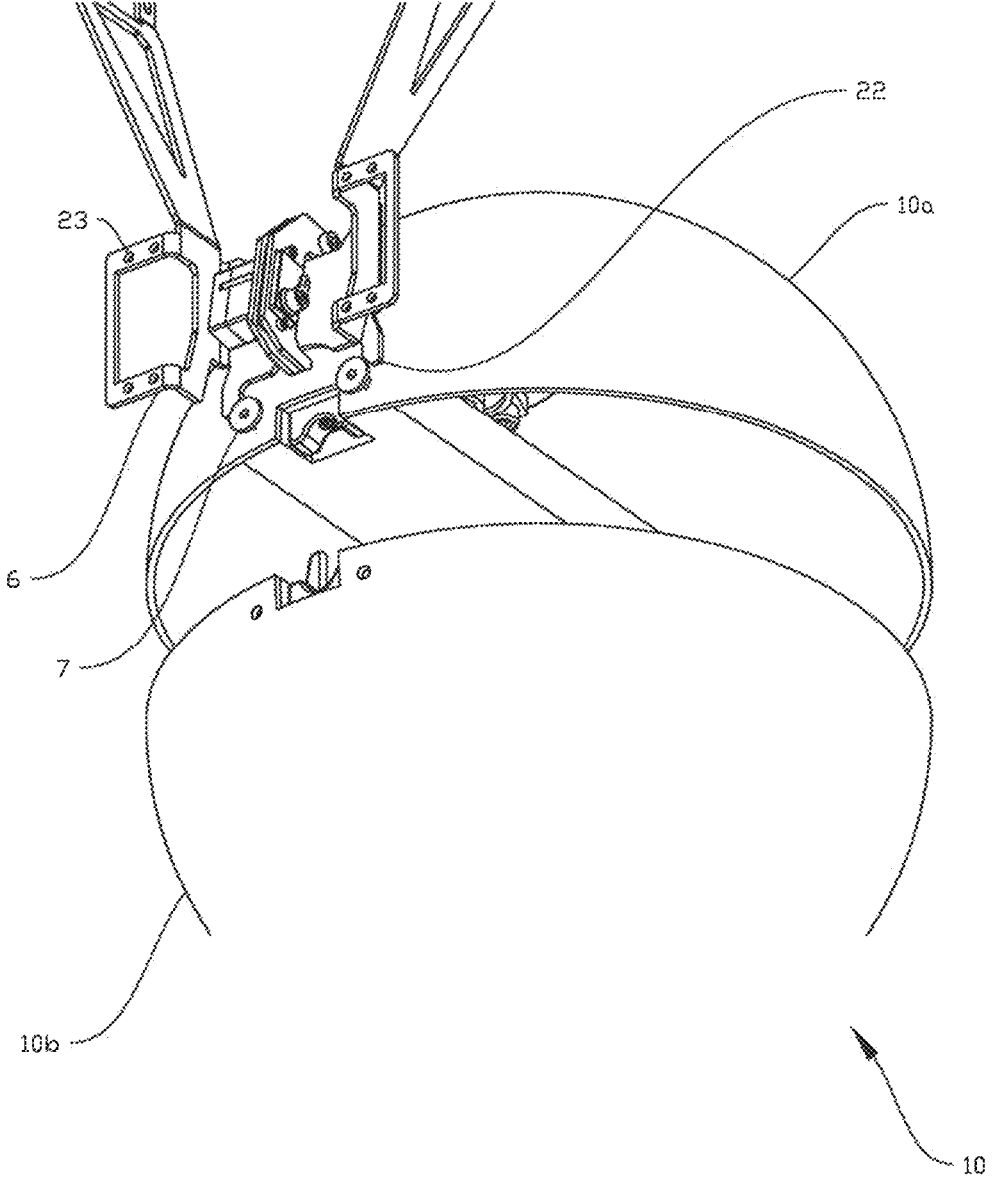
Figure 12:
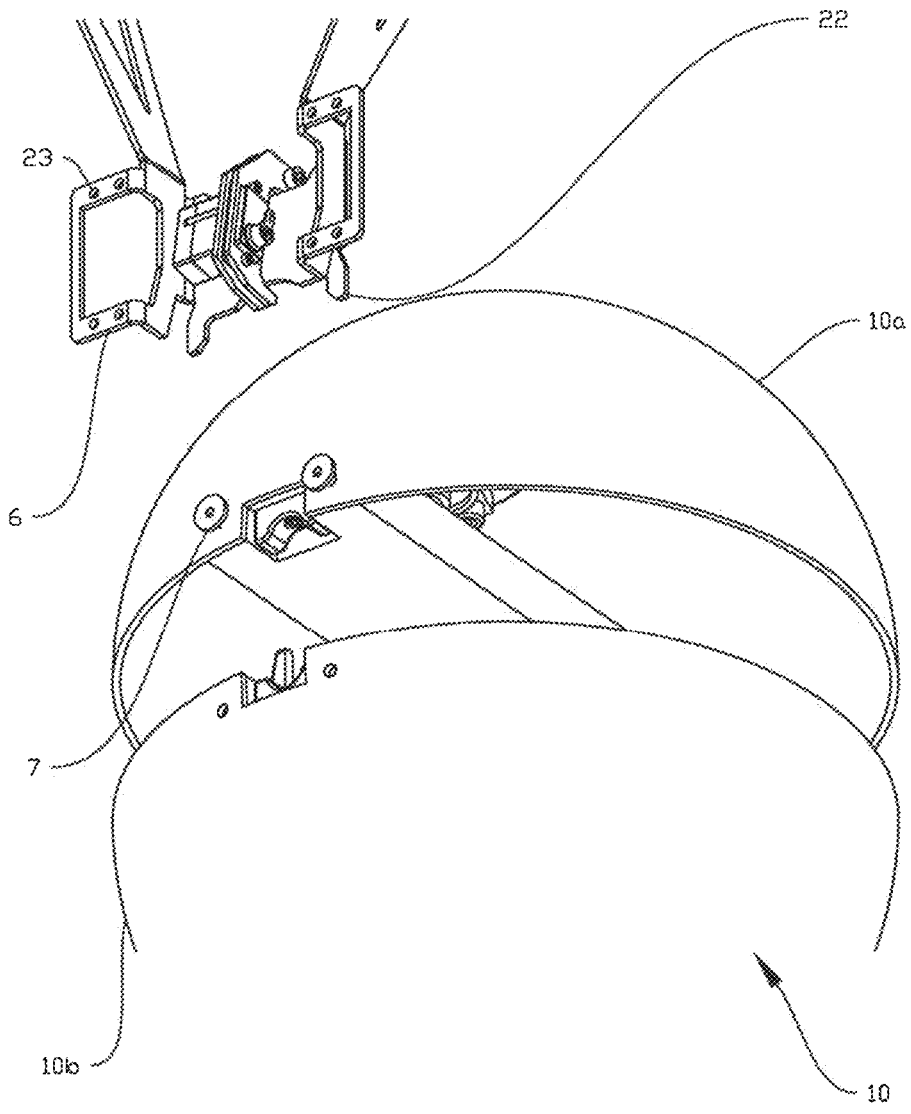
Figure 13:
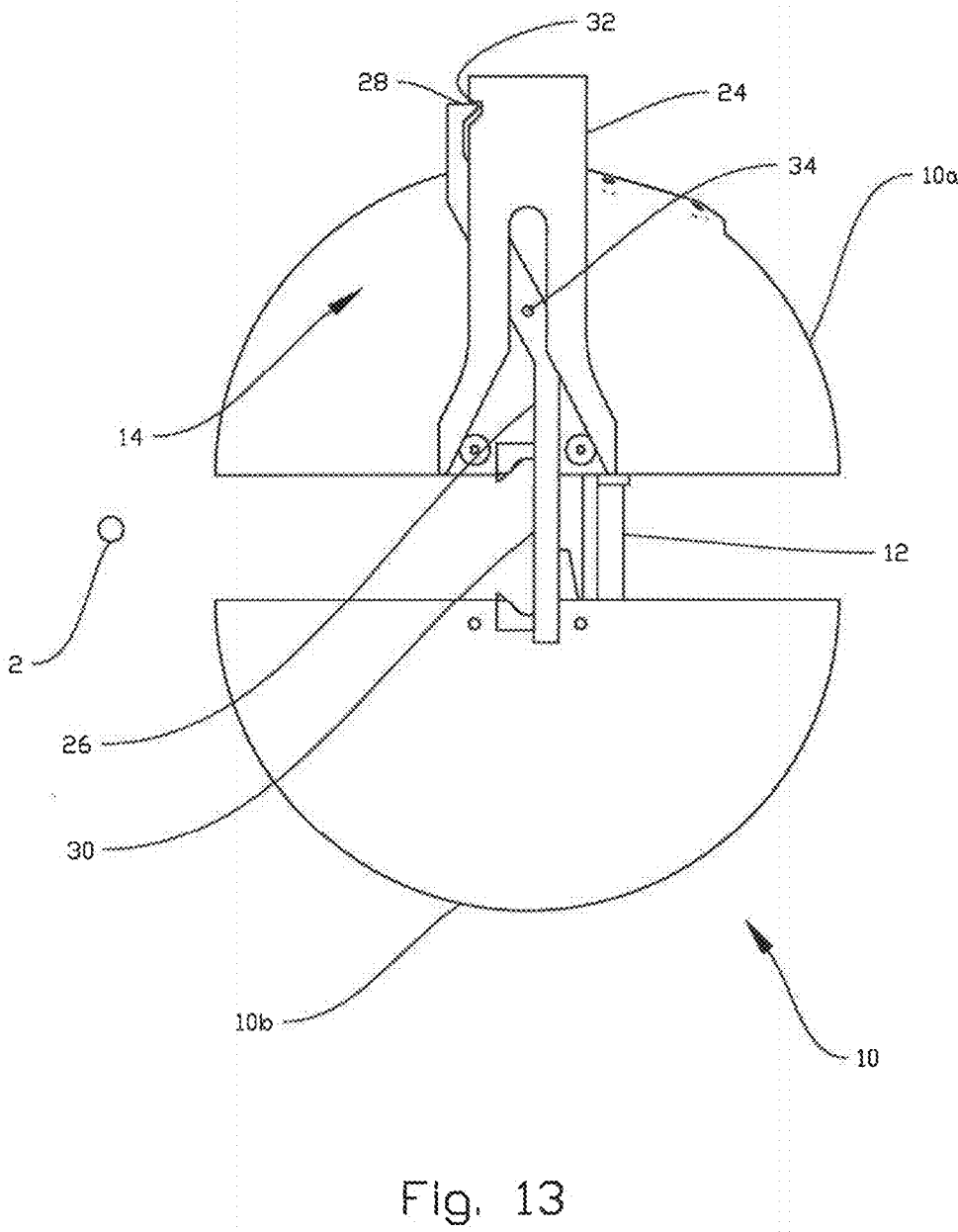
FIGS. 13-17 show, in a side view, an alternative embodiment of a device for limiting one or more degrees of freedom of the object relative to the power line.
Figure 14:
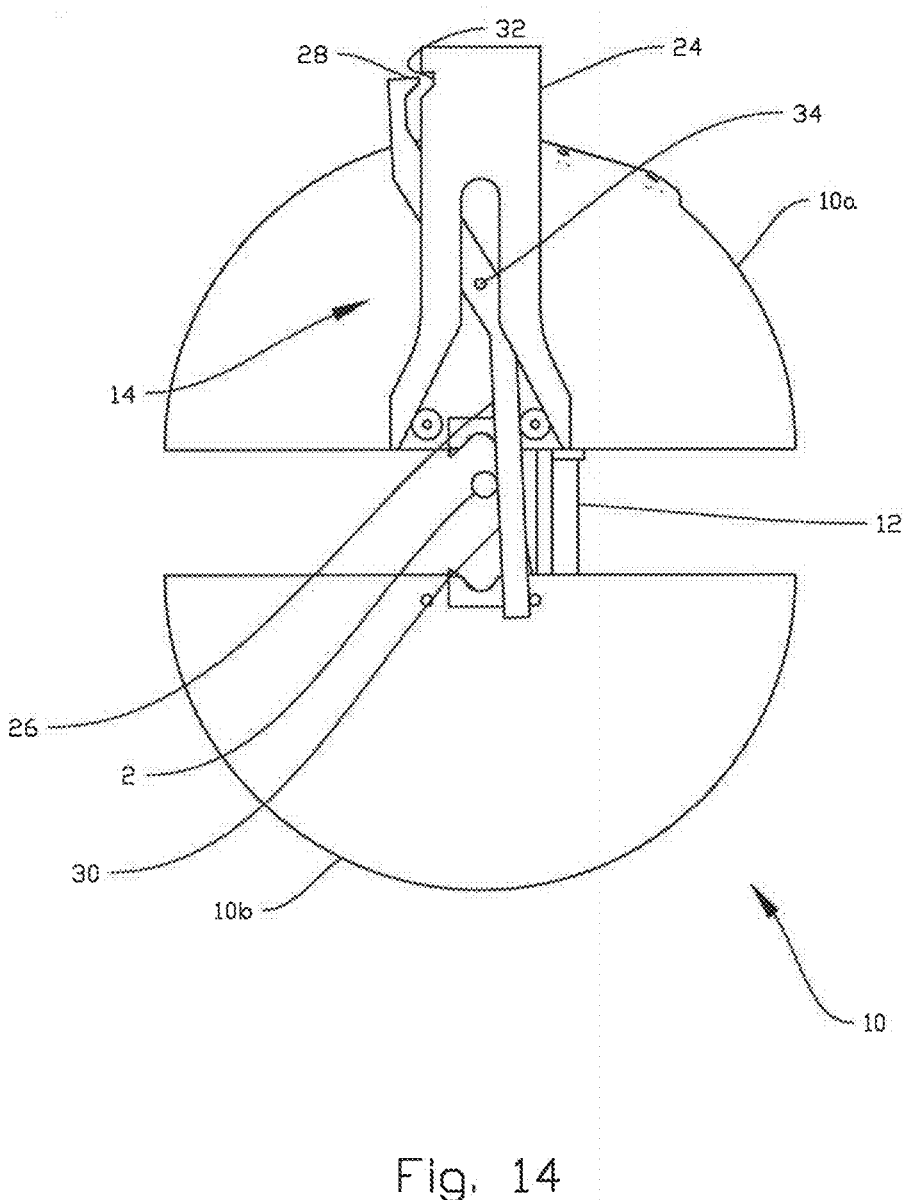

FIGS. 10-12 show, in a slightly enlarged and simplified view, the connection and disconnection of bracket 6 to and from an object 10. In FIG. 10 the bracket 6 is shown latched to a pair of screws 7 on the object 10. Once again, it should be noted that only one bracket 6 and one pair of screws 7 are visible on the drawings, while a similar bracket 6 will be engaged with a similar pair of screws 7 on the other side of the object 10. An angled pair of legs 20 is connected to the drone 1 and extends from the drone 1, which for simplicity is not shown in any of FIGS. 10-12, and down to the bracket 6. A similar, not shown pair of legs is connected to the opposite side of the drone 1 and extends down to the not shown bracket connected to the other side of the object 10. On its lower side, the bracket 6 is formed with a claw-like portion 22 adapted to engage with the screws 7. A small servo motor 25 is adapted to rotate each side of the claw-like portion 22 so that the two "claws" are rotated into and out from engagement with screws. Rotation of the claws away from engagement with the screws may be initiated on remote signal from an operator or by autonomous control. Holes 23 in the outer periphery of the bracket 6 serve as connections points for the rotatable arms 16*a, b* as shown in FIGS. 1-9. Disengagement of the bracket 6 and the arms 16 *a, b* from the object 10 and power line 2 may preferably be activated simultaneously by the servo motor 25. In FIGS. 11-12, the bracket 6 can be seen when the claw-like portion 22 is no longer locked/engaged with screws. The drone 1 is thereby freed from the object 10 and may fly away from the power line 2 as indicated in FIGS. 11-12.

Figure 15:
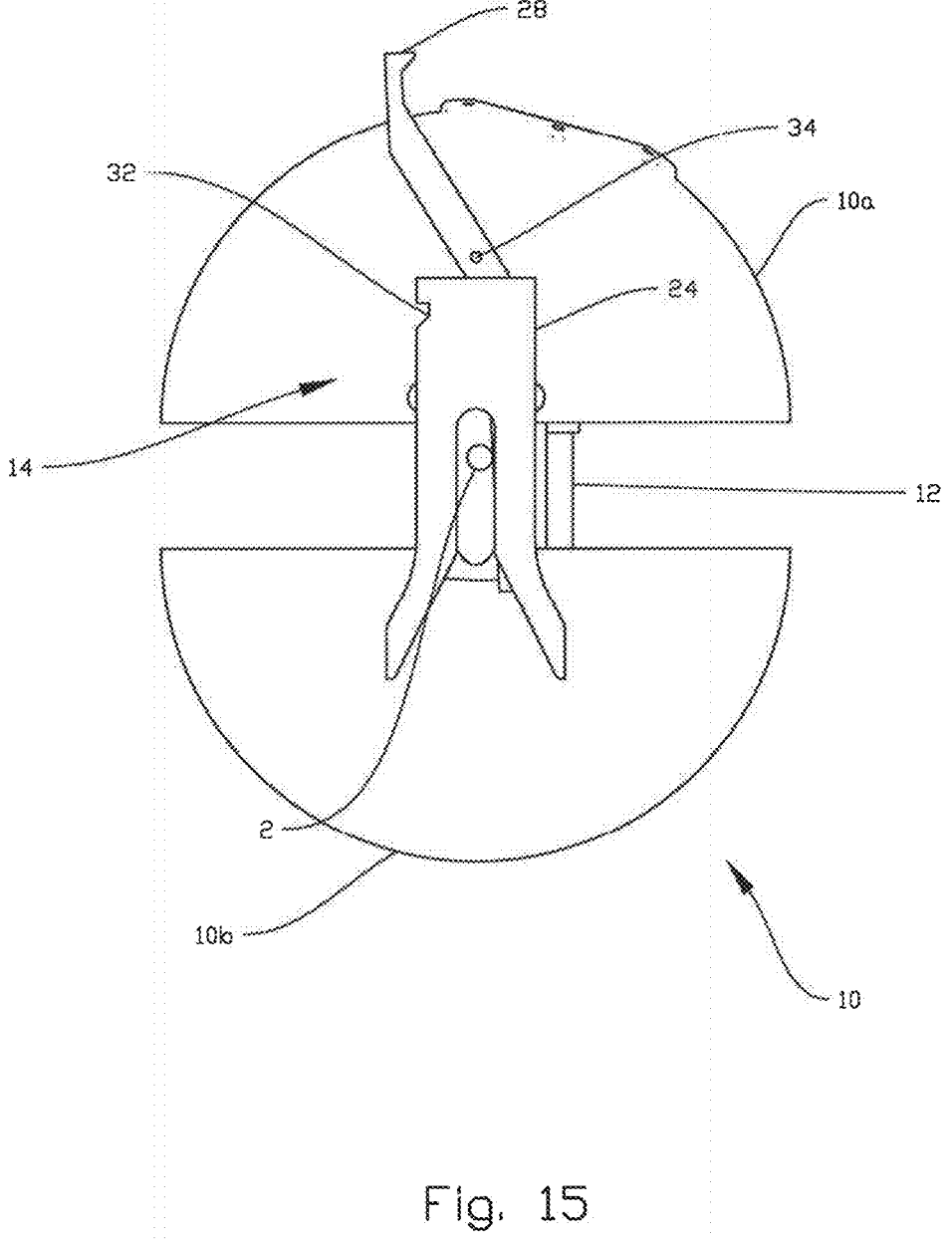
Figure 16:
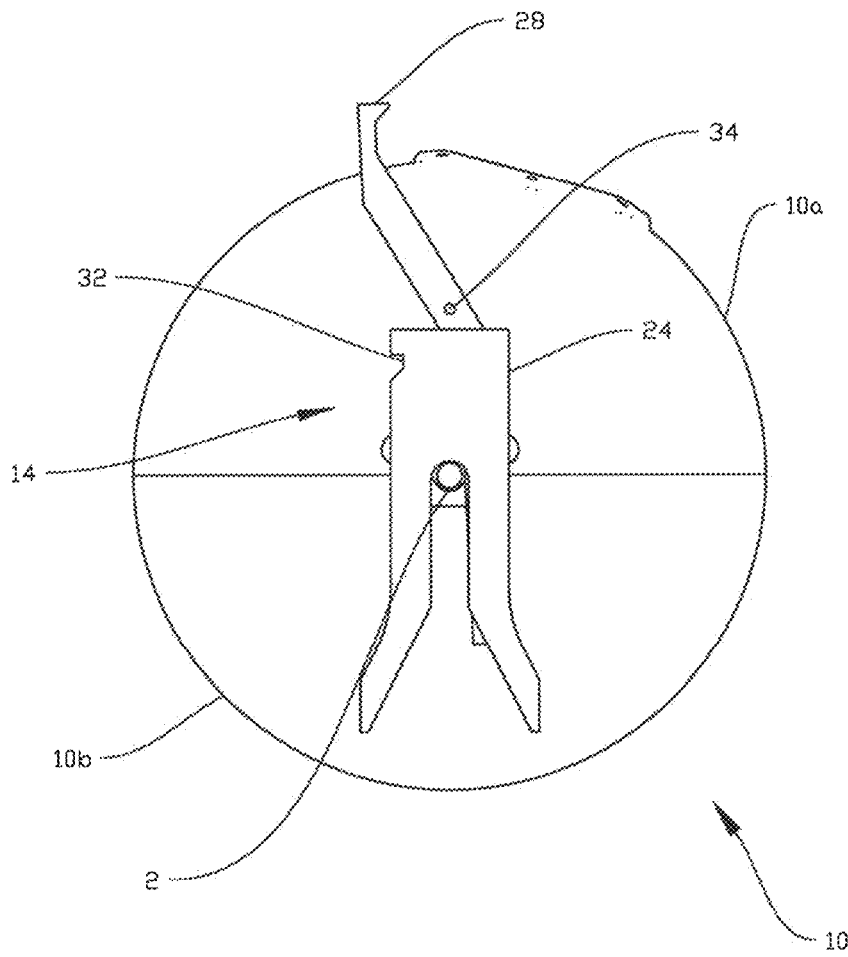
Figure 17:
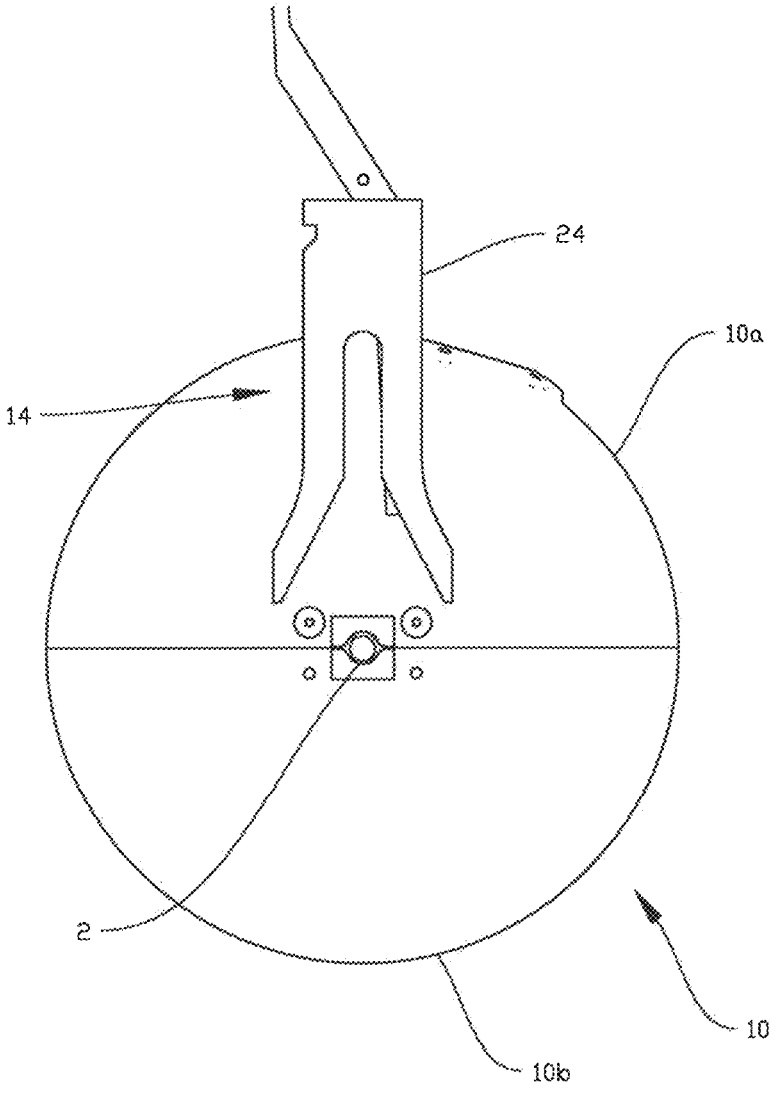

FIGS. 13-17 show another embodiment of a device 14 for limiting one or more degrees of freedom of the object 10 relative to the power line 2, here as a pair of fork-shaped clamps 24 connected to a not shown drone 1. Once again, only one of the fork-shaped clamps 24 are shown on the figure, but a similar, not shown fork-shaped clamp 24 is symmetrically provided on the other side of the object 10. For simplicity, these drawings are shown without connection to a drone 1. A releasing member, here shown in the form of an arm 26 with a claw-like top portion 28 extends in substantially vertical direction. A lower, straight portion 30 of the arm extends across the vertical gap between the two halves 10*a, b* of the object 10. The claw-like top portion 28 of the arm 26 fits into a complementary shaped recess 32 in the fork-shaped clamp 24, thus holding the clamp in a raised, elevated and non-engaged position. When the lower, straight portion of the arm 30 comes into contact with the power line 2, the arm 26 is rotated around a rotation axis 34, substantially parallel to the power line 2, with the effect that the claw-like top portion 28 is rotated out of the recess 32 with the further effect that the fork-shaped clamp 24 is free to move in a downward vertical direction. The fork-shaped clamp 24 may be biased to move in a vertical direction by means of a loaded spring or similar, or the fork-shaped clamp 24 may simply fall based on its own weight. When the fork-shaped clamp 24 has moved downwardly and come to a stop, the power line 2 is "trapped" between the two tines of the fork and the upper and lower halves 10*a, b* of the object 10 as indicated in FIG. 15. Once the power line 2 is "trapped", at least two translational and two rotational degrees of freedom are limited, implying that the object 1 will remain in a substantially constant position and orientation relative to the power line 2. While the object 10 in principle would be free to rotate around the power line 2, the connection to the drone 1 would prevent such rotation. In practice, the only degree of freedom not limited in this embodiment, is translational movement along the power line 2, which will usually not be critical for correct positioning of the object relative to the power line 2. When the fork-shaped clamp 24 has been activated to limit the mentioned degrees of freedom, the locking means 12 may be activated as discussed above with reference to FIGS. 1-9. Once the object 10 has been locked to the power line 2, the fork-shaped clamp 24 is freed from the power line 2 simply by flying the drone 1 in an upward vertical direction as indicated in FIG. 17. Since the arms fork-shaped clamps 24 are movable from an idle position to an active position, where the arms fork-shaped clamps 24 limit the degrees of freedom of the object 10 relative to the power line 2, the drone 1 may be kept at a fixed position relative to the power line 2 while the device for limiting one or more degrees of freedom is activated. This would not be possible if the device for limiting one or more degrees of freedom where simply passive guide or similar, since that would require lowering of the drone 1 towards the power line 2 during activation.

Figure 18:
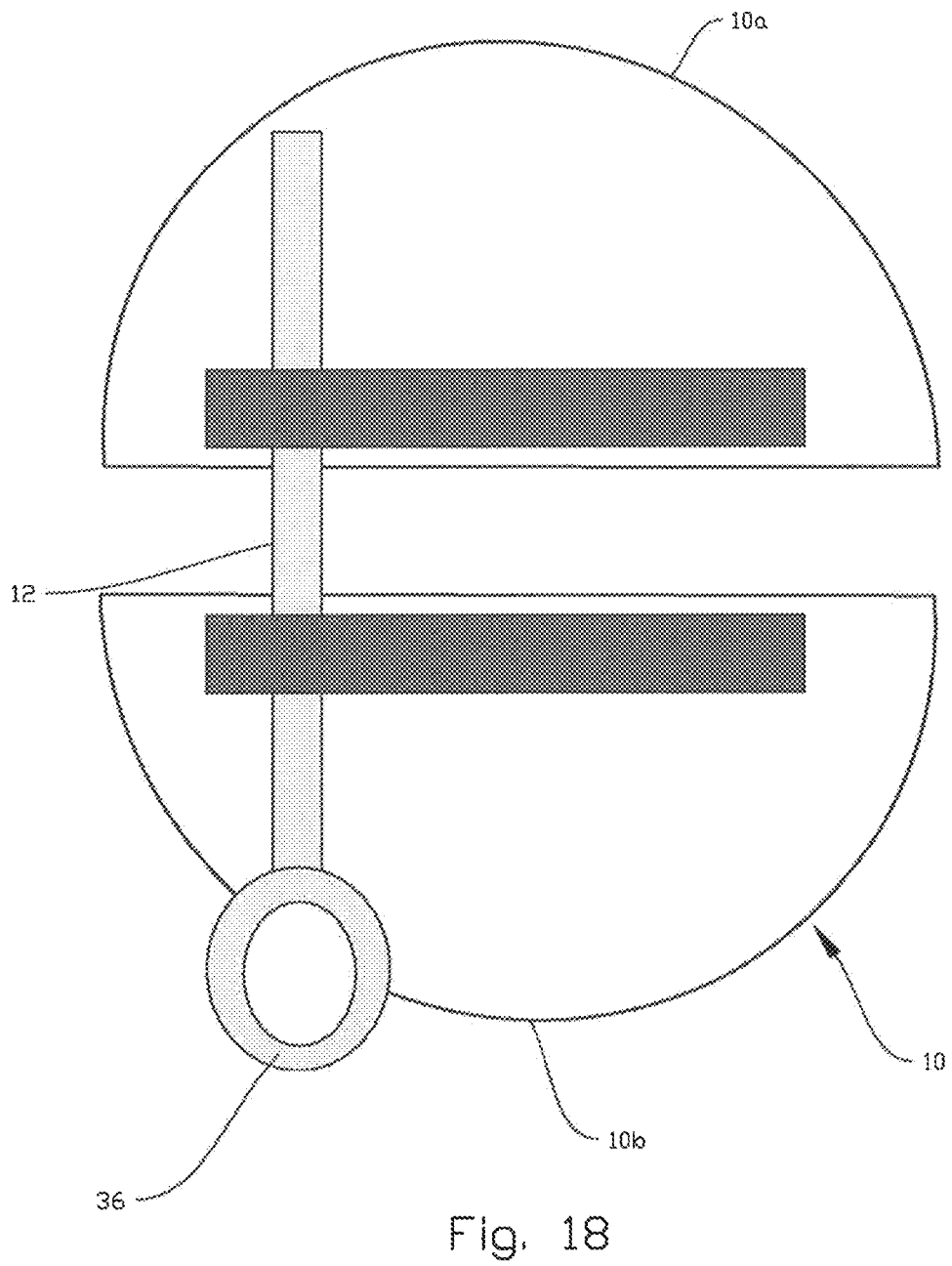
FIGS. 18-19 show, in a side view, an alternative embodiment of an object for installation on a power line.
Figure 19:
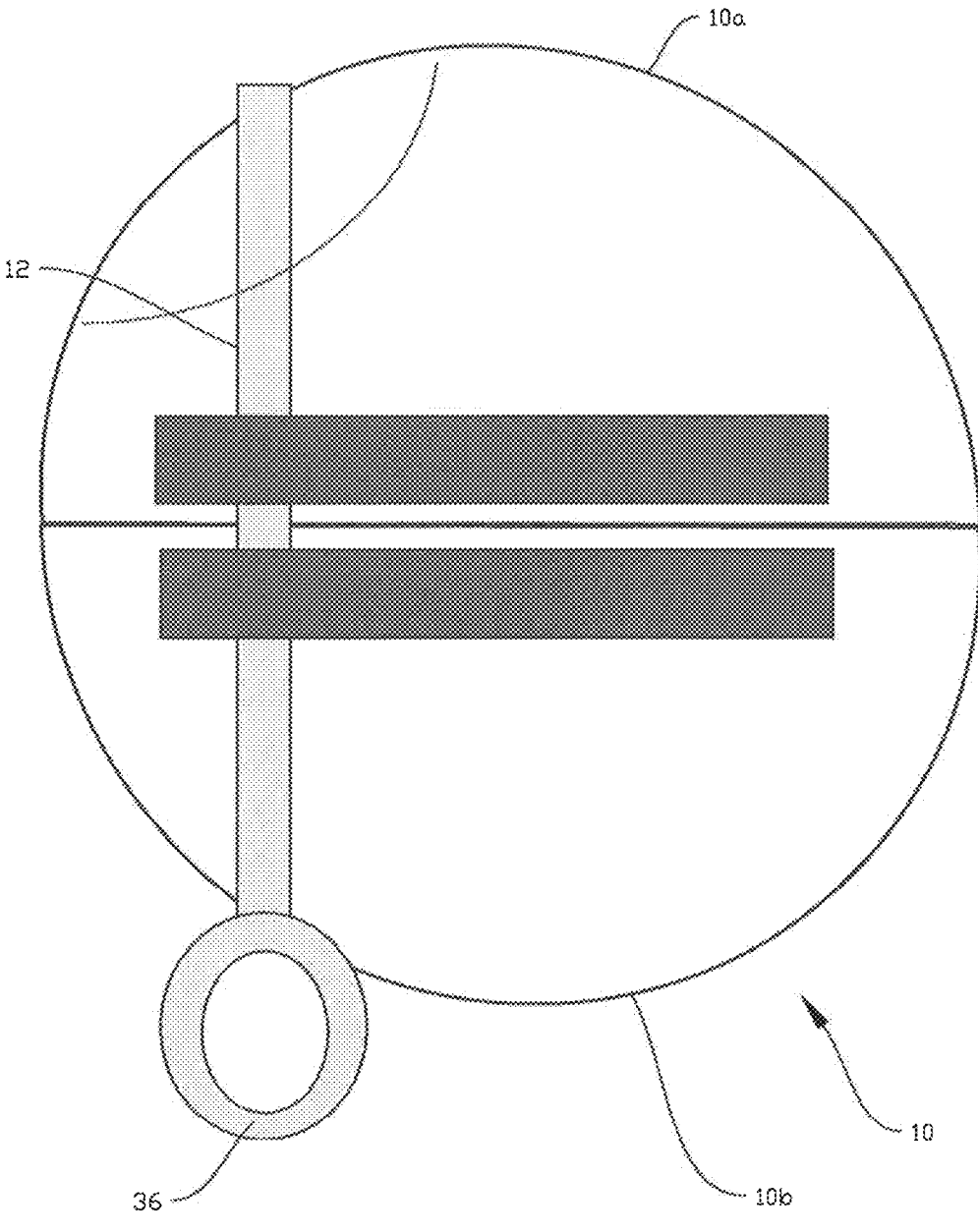

An alternative embodiment of an object 10 is shown in FIGS. 18-19, which are highly simplified. For simplicity, the drone 1, power line 2 and first and second engagements member are not shown in these figures, but a third engagement member, here in the form of an eye 36 provided at the lower end of the screw 12, is shown for illustrating the general idea of this embodiment. The screw 12 extends through the full height of the object 10, and the eye 36 is engageable from below by means of an operator via a so-called hot stick, enabling service and maintenance of the object 10 to be performed without the use of a drone. The hot stick may be used to rotate the screw 12 via the eye 36 so as to open, and thereby free the object from the power line 2 as well as to close the object to re-lock it to the power line 2.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

What is claimed is:

1. A drone for installing an object on a power line, the drone comprising:
   a power-operated tool configured to actuate a lock for locking the object to the power line,
   a connection device configured to couple the drone to the object so the drone can fly the object to the power line and further configured to uncouple the drone from the object once the object is locked to the power line via operation of the power-operated tool, and
   an arm that is movable from an idle position to an active position in which the arm is configured to limit at least one degree of freedom of movement of the object relative to the power line, the arm being independently movable to the active position before said operation of the power-operated tool to facilitate positioning of the object relative to the power line prior to said locking.

2. The drone according to claim 1, further comprising a control unit configured to control movement of the arm.

3. The drone according to claim 2, wherein the control unit comprises software adapted to cause the drone to move the arm.

4. The drone according to claim 2, further comprising a sensor configured to sense when the arm is close to and/or is contacting the power line, wherein the control unit is configured to cause the arm to move to the active position when the sensor senses that the arm is close to and/or is contacting the power line.

5. The drone according to claim 2, wherein the power-operated tool is further configured to actuate the lock to unlock the object from the power line.

6. The drone according to claim 5, wherein the control unit is configured to cause drone to move the arm to the idle position once the lock is actuated to unlock the object from the power line.

7. The drone according to claim 2, further comprising a camera, wherein the control unit is configured to control positioning of the drone relative to the power line based on an input from the camera.

8. The drone according to claim 1, wherein the arm is one of at least two arms that are independently movable from the idle position to the active position.

9. The drone according to claim 8, wherein each of the at least two arms are independently movable from the active position to the idle position.

10. The drone according to claim 8, wherein in the active position the at least two arms are configured to limit all degrees of said movement of the drone relative to the power line.

11. The drone according to claim 1, wherein the arm is motor driven from the idle position to the active position.

12. The drone according to claim 1, wherein the arm is rotatable from the idle position to the active position.

13. The drone according to claim 1, wherein the arm in the active position is configured to hold the power line in a central position of the object.

14. The drone according to claim 1, wherein the connection device comprises a bracket.

15. The drone according to claim 1, wherein the power-operated tool comprises a linear actuator.

16. The drone according to claim 1, wherein the power-operated tool comprises a screw.

17. The drone according to claim 1, wherein the power-operated tool and the arm are powered by a same source of power.

18. A drone assembly comprising the object and the drone according to claim 1.

19. A drone for installing an object on a power line, the drone comprising:

a power-operated tool configured to actuate a lock for locking the object to the power line, a connection device configured to couple the drone to the object so the drone can fly the object to the power line and further configured to uncouple the drone from the object once the object is locked to the power line via operation of the power-operated tool, and a clamping device that is movable from an idle position to an active position in which the clamping device is configured to limit at least one degree of freedom of movement of the object relative to the power line, the clamping device being independently movable to the active position before said operation of the power-operated tool to facilitate positioning of the object relative to the power line prior to said locking.

20. A method for installing an object on a power line, the method comprising:

flying a drone to the power line, the drone carrying the object, moving an arm of the drone from an inactive position to an active position for limiting at least one degree of freedom of movement of the object relative to the power line, and thereafter actuating a lock to lock the object to the power line, moving the arm to the inactive position, decoupling the drone from the object, and flying the drone away from the power line.

* * * * *